(12) United States Patent
Hansen

(10) Patent No.: US 8,844,254 B2
(45) Date of Patent: Sep. 30, 2014

(54) WINDROW TURNING APPARATUS

(71) Applicant: Jorgen Pilgaard Hansen, Marsden (AU)

(72) Inventor: Jorgen Pilgaard Hansen, Marsden (AU)

( * ) Notice: Subject to any disclaimer, the term of this patent is extended or adjusted under 35 U.S.C. 154(b) by 22 days.

(21) Appl. No.: 13/633,174

(22) Filed: Oct. 2, 2012

(65) Prior Publication Data

US 2014/0020357 A1 Jan. 23, 2014

(30) Foreign Application Priority Data

Jul. 13, 2012 (AU) ................................ 2012205121

(51) Int. Cl.
*A01D 80/00* (2006.01)
(52) U.S. Cl.
USPC .......................................................... 56/372
(58) Field of Classification Search
USPC ............................ 56/372, 370, 366, 365, 350
See application file for complete search history.

(56) References Cited

U.S. PATENT DOCUMENTS

| | | | | |
|---|---|---|---|---|
| 2,695,487 A | * | 11/1954 | Glienke | 56/15.3 |
| 3,369,797 A | * | 2/1968 | Cobey | 366/196 |
| 4,360,065 A | | 11/1982 | Jenison et al. | |
| 4,976,095 A | * | 12/1990 | Schnittjer | 56/350 |
| 4,991,384 A | * | 2/1991 | Steckly | 56/202 |
| 5,001,894 A | * | 3/1991 | Slater | 56/372 |
| 5,253,467 A | * | 10/1993 | Sims, Jr. | 56/372 |
| 5,586,731 A | | 12/1996 | Glaze et al. | |
| 6,047,910 A | * | 4/2000 | Murphy | 241/21 |
| 6,931,826 B1 | * | 8/2005 | Schromen et al. | 56/192 |
| 7,681,382 B2 | * | 3/2010 | Viaud | 56/10.2 E |

FOREIGN PATENT DOCUMENTS

DE 4215599 11/1993

OTHER PUBLICATIONS

First Examination Report issued on Nov. 14, 2013, in connection with Australian Patent Application No. 2012205121.

* cited by examiner

*Primary Examiner* — Thomas B Will
*Assistant Examiner* — Mai Nguyen
(74) *Attorney, Agent, or Firm* — Antonelli, Terry, Stout & Kraus, LLP.

(57) ABSTRACT

An elongate rotatable drum for use in a windrow turning apparatus is provided. The drum has paddles adapted to engage with material in a windrow. The paddles form at least one pair of opposed rows, each row being made up of a plurality of paddles defining a helical path along the drum, the helical path of the paddles the opposed paired rows promote movement of the material to a common focal area. Also provided is a composting machine incorporating the drum.

15 Claims, 10 Drawing Sheets

WINDROW TURNING APPARATUS

REFERENCE TO RELATED APPLICATIONS

This application claims an invention which was disclosed in Australian Patent Application No. 2012205121 filed Jul. 13, 2012 by the present inventor. The benefit of said application is hereby claimed, and the aforementioned application is hereby incorporated herein by reference.

TECHNICAL FIELD

The present invention is directed to a rotating drum containing paddles having a particular orientation along the drum to enable the paddles to turn and shape windrows of material (typically compost material) in an improved manner. The drum can replace conventional drums in existing windrow turning apparatus or can be part of a new apparatus.

BACKGROUND

Windrows are rows of material—usually cut vegetation—piled into long heaps. The windrow can comprise rows of cut or mowed hay or a grain crop. Windrows are also used for composting cut plant material such as crop residues, manure, compostable waste material and the like.

The rows of composting material need to be periodically mixed and turned to improve aeration, blend the materials in the windrow, break up any lumps and fibrous material, and to provide a more uniform temperature profile in the windrow.

Windrow turning apparatuses are known which mix and turn the windrows. For smaller windrows these apparatuses can be towed by a tractor. FIG. 10 illustrates a known windrow turning apparatus being towed by a tractor. These devices have an elongate rotating drum fitted with paddles which pass through the windrow and mix and agitate the material in the windrow.

To promote a more rapid composting it is beneficial that the materials in the windrow are blended as uniformly as possible. Similarly, any fibrous material and particulate matter should be broken up as small as possible. There would be an advantage if it were possible to provide a windrow turner which could better blend and break up material in the windrow.

One method to improve the capacity of the windrow is to increase the height of the windrow. However, this requires large and expensive (and usually self-powered) machinery to turn the windrows. Existing towed windrow turners are not able to work efficiently with larger capacity windrows. There would be an advantage if it were possible to provide a towed windrow turner which could work with increased windrow capacity due to increased windrow height.

Improved composting and more efficient turning also requires a clean edge and base profile of the windrow. There would be an advantage if it were possible to provide a windrow turner which provided a cleaner edge and base profile of the windrow Any references to methods, apparatus or documents of the prior art are not to be taken as constituting any evidence or admission that they formed, or form part of the common general knowledge.

It is an object of the present invention to provide a drum for use in a windrow turner for use in the composting industry, and optionally a windrow turning apparatus which may overcome some of the above mentioned disadvantages or provide a useful or commercial choice.

SUMMARY OF THE INVENTION

According to a first aspect of the present invention there is provided an elongate rotatable drum for use in a windrow turning apparatus, the drum comprising paddles adapted to engage with material in the windrow, the paddles comprising at least one pair of opposed rows, each row comprising a plurality of paddles defining a helical path along the drum, the helical path of the paddles on said one opposed row and the helical path of the paddles on the other said opposed row promoting movement of said material to a common focal area.

The drum may be part of a new apparatus or may replace a conventional drum of an existing apparatus.

The drum has paddles which are positioned along the drum in a particular and unique manner to provide improvements in windrow management.

In particular, the paddles are positioned along the drum in such a manner that as the drum rotates and moves through a windrow, the paddles will push or kick the windrow material towards a central focal point. Thus, as the paddles rotate and move through the windrow, they keep the windrow shape better than previous devices and can also enable the windrow height to be maximised thereby increasing the capacity of the windrow. The paddles can also provide more uniform blending, can improve the particle and fibrous breakup, and can provide a clean edge and base profile by maintaining the windrow shape during use.

The drum (which is sometimes also referred to as a reel, shaft or cylinder), typically comprises an elongate cylindrical member. The drum may have any suitable length which will depend, inter alia, on the size and shape of the windrow. It is envisaged that the drum will have a length of between 1-6 m and typically between 2-3 m although this can vary to suit and it is not considered that any unnecessary limitation should be placed on the invention merely by the provision of certain lengths of the drum.

The drum may have any suitable diameter and it is envisaged that a suitable diameter will be between 10-60 cm although this can vary to suit.

There may be circumstances where the drum will be other than cylindrical. For instance, there may be circumstances where the drum has a substantially rectangular cross-section, or a somewhat oval cross-section, or a polygonal cross-section although it is envisaged that the most convenient configuration of the drum will be cylindrical.

There may be circumstances where the drum may comprise a plurality of elongate rods or bars or similar elongate members which may be fixed relative to each other to provide a somewhat cylindrical type configuration. There may be circumstances where elongate members as described above are provided which may have a configuration other than somewhat cylindrical.

If the drum comprises an elongate cylindrical member, it is envisaged that the member will be hollow or substantially hollow, inter alia, to reduce weight and cost. Thus, the elongate cylindrical member may comprise an elongate pipe or something similar. The thickness of the pipe may vary depending on the material of the pipe and the use of the drum. It is however envisaged that the pipe wall will have a thickness of between 4-20 mm although this can vary to suit.

It is envisaged that the surface of the drum will be substantially solid. However, there may be circumstances where the surface of the drum may be perforated, or may comprise a mesh type material or grid like material. The surface may also be provided with recesses, cutouts and the like.

Typically, the elongate rotatable drum will comprise a single length. However, there may be circumstances where it is desirable that the drum comprises two or more members which are attached together or relative to each other. The members may be substantially identical or different.

The drum will typically be made of metal such as steel. However, there may be circumstances where the drum is made from other materials such as aluminium or alloys or non-metal materials such as plastics (typically reinforced plastics or engineering plastics), laminate materials and the like.

The drum comprises a plurality of paddles adapted to engage with the compost or other material. The paddles are sometimes also referred to as blades, fingers, tines, or mixing members; however throughout the present specification the term paddles will be used.

The paddles may have any suitable shape and size. It is envisaged that the paddles will have a front face (leading face) and a rear face (trailing face). The front face is adapted to contact the material in the windrow. It is envisaged that the front face will be substantially smooth and will typically be substantially planar or flat. However, there may be circumstances where it is desirable for the front face to be provided with projections or other extensions (to better engage with the material). There may be circumstances where it is desirable for the front face to be curved or be other than substantially flat.

The paddles may be substantially rectangular for ease of manufacture and efficiency of use. There may be circumstances where the paddles may have a shape other than rectangular.

If the paddles are substantially rectangular, it is envisaged that each paddle will have a length of between 5-20 cm and a width of between 2-10 cm although this can vary. In a preferred embodiment the paddle material thickness averages between 8 to 12 mm though it may be less or greater in some circumstances.

The rear face of each paddle may be reinforced to prevent the paddle from damage, bending or being snapped off the drum during use. Thus, the rear face of each paddle may be provided with a reinforcement such as a reinforcing bracket.

The paddles may be made of any suitable material and it is envisaged that steel plate will be a suitable material. There may be circumstances where the paddle is made of other material such as a different type of metal (e.g. aluminium or alloy) or of a non-metal material such as a plastic material, laminate materials and the like. The paddle will typically comprise a solid material. There may be circumstances where it is advantageous for the paddle to be formed with one or more openings perhaps to reduce the weight of the apparatus and improve mixing and/or aeration. These openings may comprise holes, slots, cutouts and the like.

It is envisaged that the paddles will be identical or similar to each other although there may be circumstances where some of the paddles are of a different material, shape and design.

The paddles can be attached to the surface of the drum by any suitable means. One suitable means is by welding each paddle to the drum. However, other types of attachment means are also envisaged including the use of fasteners such as bolts, and the like. There may also be circumstances where adhesive may be used. A plurality of paddles may be attached to a common base member which may be attached to the drum.

The paddles will typically be provided with removable tips (wear plates) which can be replaced when worn. These tips may comprise metal plates which can be attached by any suitable means to the paddles. For instance, the metal plate may be bolted to a respective paddle. The removable tips may comprise various shapes to improve the efficiency of the apparatus. It is also envisaged that the tips on some paddles may have a shape which is different than the tips on the other paddles.

The paddles on the drum comprise rows of paddles. The drum will comprise at least one pair of opposed rows. The drum may comprise more than one pair of opposed rows. Each row will comprise a plurality of paddles and it is envisaged that each row will comprise between 5-15 paddles although this can vary, inter alia, on the size of the paddles, the length of the drum et cetera. The paddles are typically spaced apart relative to each other and it is preferred that the spacing between adjacent paddles is substantially uniform. The spacing can vary but it is envisaged that a suitable spacing will be between 20-100 mm although this can vary to suit. The spacing between adjacent paddles may be about the same as the width of a paddle. Thus if a paddle has a width of 50 mm, the spacing between adjacent paddles may be about 50 mm or thereabouts.

The at least one pair of opposed rows of paddles will have each row defining part of a helical or screw pathway along the outside of the drum. The helical pathway of one row and the helical pathway of the other (opposed) row are oppositely directing such that when the paddles move through compost material or other material of the windrow, the material, as well as being aerated and mixed, is pushed to a common focal area. Thus, the helical pathway of the paddles on one row can push the material in one way (towards the common focal area) and the helical pathway of the paddles on the other row can push the material the other way and also towards the common focal area. This can result in the drum maintaining an improved windrow profile and particularly enabling the height of the profile to be maximised therefore improving the capacity of the windrow.

It is envisaged that the common focal area will be in the middle area of the drum. In this version of the invention, one row of paddles can extend from adjacent one end of the drum and to the central or middle area of the drum and the other row of paddles can extend from adjacent the other end of the drum and to the central or middle area of the drum. As the drum and the paddles rotats through the windrow, the helical row of paddles will kick material towards the centre or middle area of the drum to maintain the profile of the windrow. An example of this version of the invention is illustrated at least in FIG. 4, wherein the flaps 44 (shown in FIG. 1) have been omitted for clarity.

It is envisaged that the drum may be sufficiently long to enable two, or even more, windrows to be turned and mixed. In this version of the invention, there may be provided a first opposed pair of rows of paddles and a second opposed rows of paddles with the first opposed rows of paddles kicking material to a first common focal point (a first windrow) and the second opposed rows of paddles kicking material to a second and different focal point (a second windrow). However, it is also envisaged that unless the windrows are quite small, this version of the invention may result in large and expensive machinery.

To further facilitate movement of the material to a common focal area, and to improve windrow management, the paddles may be attached to the drum at different angles. The different angles may be referred to as the pitch of the paddle relative to the longitudinal rotational axis of the drum. Thus, if the face of the paddle is at right angles to the longitudinal rotation axis of the drum, the pitch of the paddle is 90° and if the face of the paddle is in line with the longitudinal axis of the drum, the pitch of the paddle is 0°.

It is preferred that the paddles in each row have different angles as the paddles progress from a distal part of the row (that is furthest away from the common focal area) to a proximal end of the row (that is closest to the common focal area). If the drum contains a single pair of rows, the distal end of each row will typically be adjacent to the end of the drum and the proximal end of each row will be adjacent the centre or middle of the length of the drum.

It is preferred that the pitch of the paddles is greater at the distal end of each row and less at the proximal end of each row and it is preferred that the pitch gradually and uniformly changes along the row. It is envisaged that the pitch of the paddles adjacent the distal end of each row will be between 45°-75° and that the pitch of the paddles at or adjacent the proximal end of each row will be 0° or approximately 0°.

The helical path of each row of paddles is preferably such that the row progresses from the distal end to the proximal end in no more than a single revolution of the drum. If the drum contains a single pair of rows, it is preferred that the row progresses from adjacent one end of the drum to the approximate middle of the drum in a single revolution.

For longer drums, there may be an opportunity to mix and turn two or more windrows rather than a single windrow. This can be achieved as previously described by providing pairs of opposed rows along the drum, which each pair treating a single windrow.

For larger diameter drums, there may be an opportunity to provide more than one start on each drum. A start may be defined as a single row of paddles. Thus, instead of a single pair of opposed rows treating a particular windrow, the drum may be provided with a first pair of opposed rows (a first start) kicking material to a focal point and the drum may also be provided with a second pair of opposed rows (a second start) behind or in front of the first pair to also kick material to the same focal point. This can provide greater efficiency in action, by having the windrow material mixed twice (or more) for each revolution of the drum.

It is also envisaged that the paddles my comprise a helical fin or plate on the outside of the drum. The plate or fin may contain cutouts, or be tooth like to emulate paddles.

The drum may comprise the requirements to enable the drum to be rotatably supported by windrow turning apparatus or other suitable apparatus. Thus, the drum may be fitted with opposed stubs to enable the drum to be journaled into bearings on the apparatus and to enable a drive wheel/cog or something else to be attached to enable the drum to be rotated. As an example, the drum may comprise a substantially hollow cylinder containing end plates with a solid rod extending through the hollow cylinder and through each end plate to provide the necessary attachments.

The drum may be attached to or form part of a windrow apparatus. The apparatus may comprise some form of framework or chasses which may comprise elongate members, sheet members and the like attached relative to each other by any suitable means. Suitably, the framework comprises a pair of opposed side frames interconnected by a top frame which may be curved.

The side frames may include sheet members typically formed of metal. The drum may be supported for rotation between the side frames.

A drive means may be provided to rotate the drum. The drive means may comprise a hydraulic motor, a pneumatic motor, or some form of gear arrangement. The drive means may be supported by one of the side frames. The drive means is preferably powered by a tractor which tows the apparatus. However, there may be circumstances where there is an advantage to provide the apparatus with its own power such as by a petrol/diesel engine or electric motor.

The apparatus may comprise ground wheels which may be adjustable to raise or lower the apparatus. The wheels may be rotatable about a stub axle. The axle may be attached to an arm member. The arm member may be pivotally attached to part of the apparatus to move between a raised and lowered position. The arm member may be operated by an operating means such as a ram which may be a hydraulic ram. Extension of the ram may cause the wheels to be further lowered to raise the apparatus and retraction of the ram may cause the wheels to be raised to lower the apparatus. In the raised position, the apparatus can be better transported to and from a windrow and in the lowered position the drum can better pass through the windrow. The wheels may be adjustable to various positions.

One difficulty with existing towed windrow turning apparatus is that the tractor needs to be adjacent one side of the windrow while towing. This can cause the wheels of the windrow apparatus to "crab" causing difficulties in maintaining a straight and properly profiled windrow. In the present invention, the stub axles can be offset relative to the direction of travel of the apparatus to at least partially reduce the tendency of the apparatus to be pulled to one side of the windrow by the leading tractor. It is considered that an offset angle of about 5° is suitable.

The windrow apparatus may include a tow arm to enable the apparatus to be connected to a tractor and may also enable the apparatus to be powered by the tractor. The tow arm may be attached to one side of the apparatus. The tow arm may include a drivetrain to enable the driven parts of the apparatus to be powered by the PTO of the tractor. The tow arm may also include hydraulic conduits. The tow arm may be hinged to the remainder of the apparatus about a substantially vertical axis. A ram or other means may be provided to operate the tow arm to enable the apparatus to be positioned behind the tractor for transport or behind and to one side of the tractor during use with a windrow.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 10:
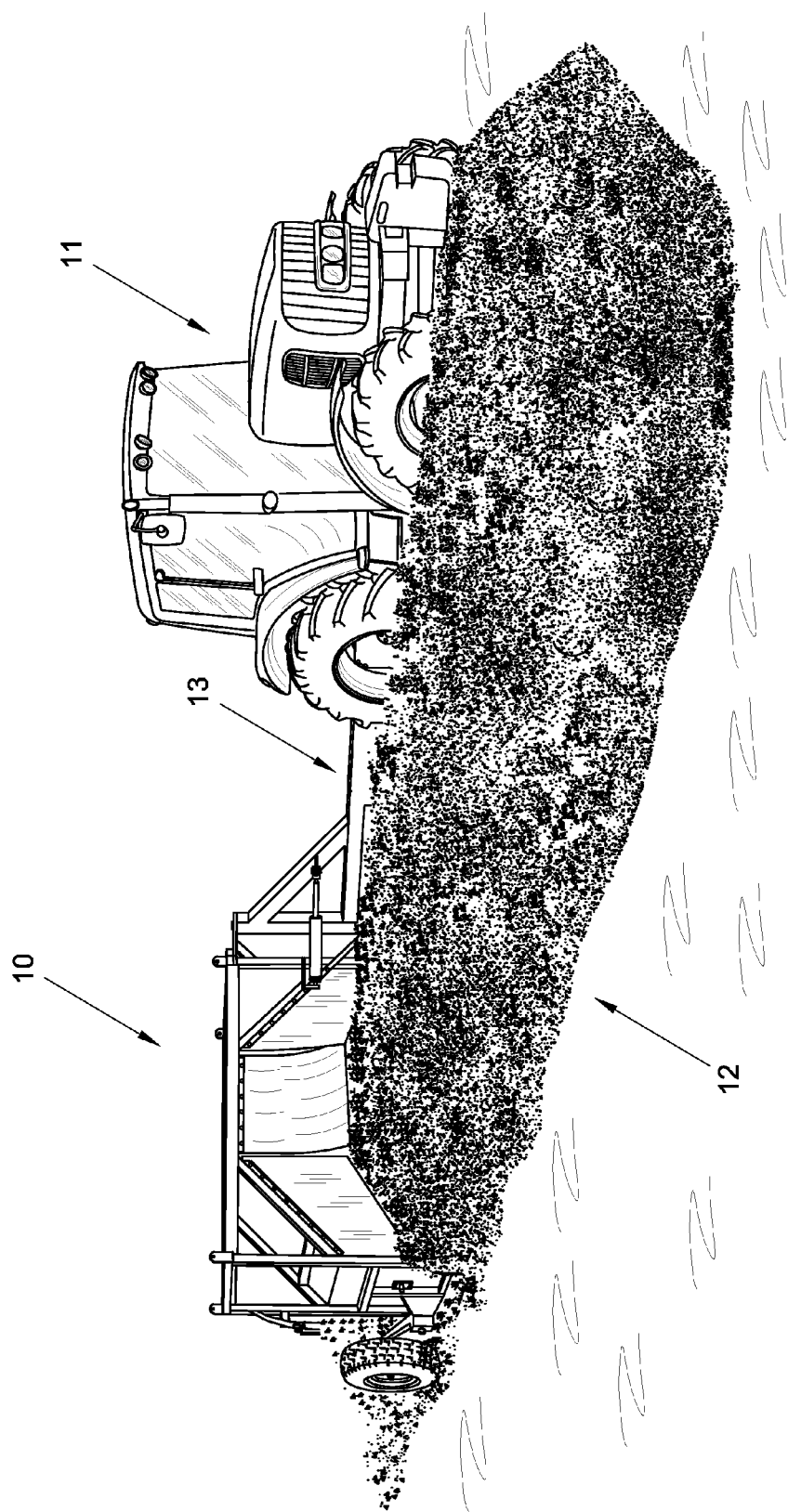
FIG. 10. Illustrates a PRIOR ART windrow turning apparatus in use.

Referring initially to FIG. 10, there is illustrated a prior art windrow turning apparatus 10 being towed behind and to one side of a tractor 11, and treating a windrow 12 which, in this example, comprises compost. The existing apparatus 10 has a horizontal drum containing extending paddles. As the drum rotates in the windrow, the paddles cause of windrow material to be mixed, turned and aerated.

The present invention is directed to a drum having extending paddles which are positioned on the drum in a unique manner to provide improvements to the treatment of the material in a windrow. The drum may be retrofitted to an existing windrow or fitted to a new windrow apparatus. The present invention will be described with reference to the drum being fitted to a new windrow apparatus.

Another disadvantage with the existing windrow apparatus 10 illustrated in FIG. 10 is that the apparatus is attached to tractor 11 by a tow arm 13. The tow arm 13 is attached to the rear of the tractor and to one side of the windrow apparatus 10. To prevent the tractor 11 from driving through the windrow 12, the windrow apparatus 10 is positioned to one side of the tractor. Consequently, as to tractor moves forwardly, there is a sideways dragging force on windrow apparatus 10 which can be detrimental to the efficiency of the apparatus.

As mentioned above, one aspect of the present invention is directed to an improved drum for use in a windrow apparatus. Reference will now be made to FIGS. 5-6 and FIGS. 3-4 which illustrate the improved drum containing the particularly positioned paddles.

Figure 5:
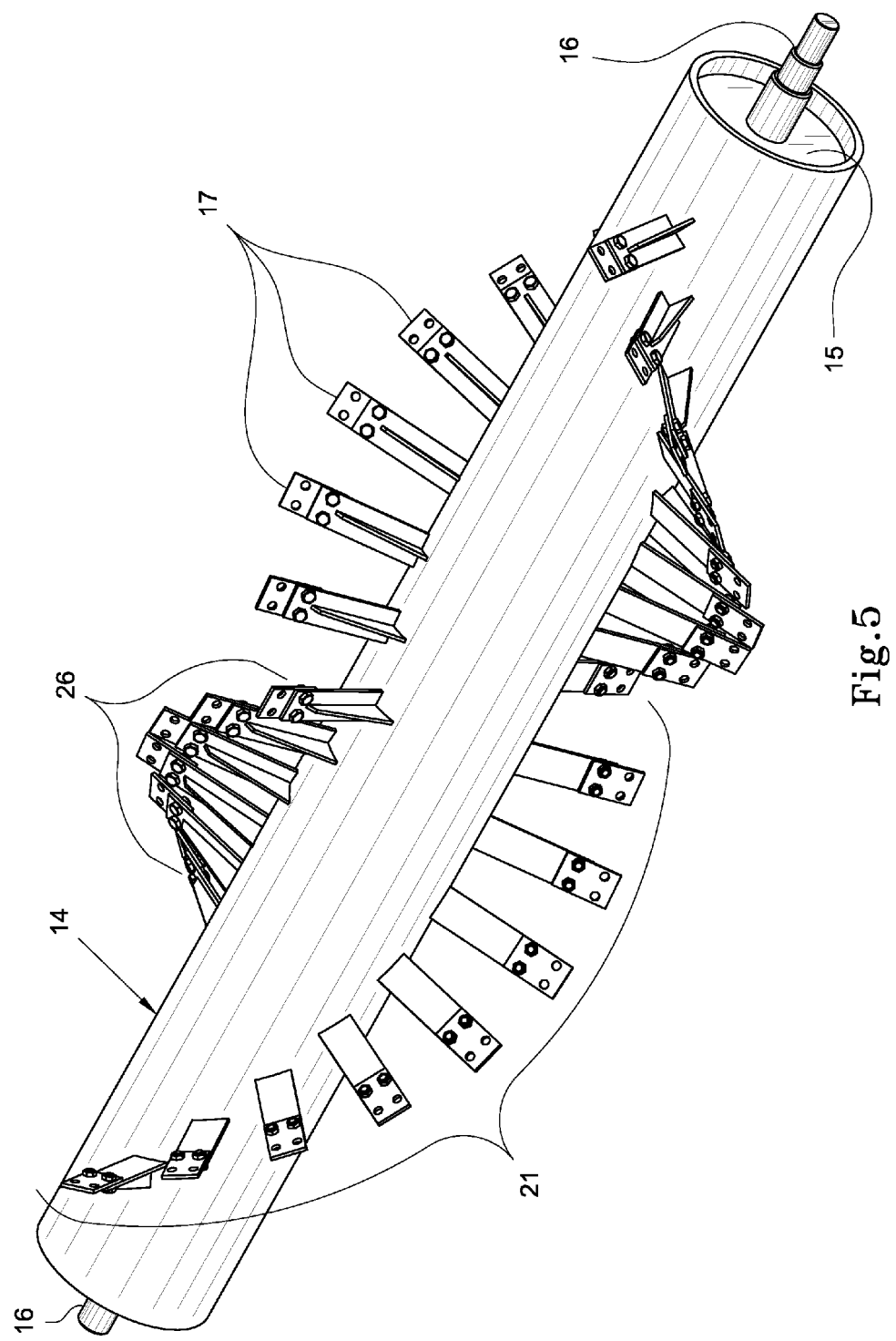
FIG. 5. illustrates a drum with paddles according to an embodiment of the invention.
Figure 6:
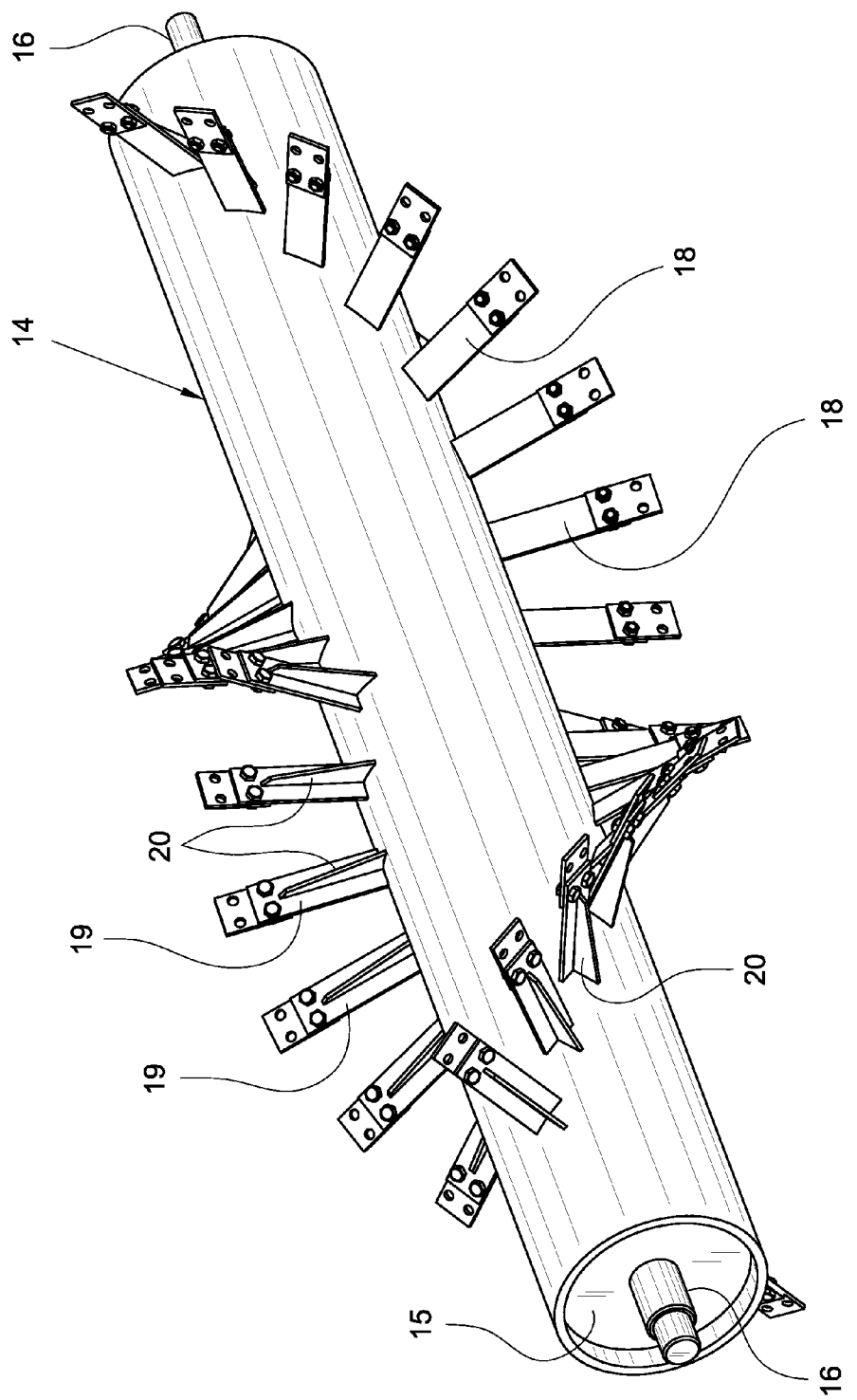
FIG. 6. Illustrates the drum of FIG. 5 from a different angle.

Referring initially to FIGS. 5 and 6, there is illustrated a windrow drum 14 which, in the present embodiment, comprises a hollow steel cylinder having a length of approximately 2 m and a diameter of between 20-40 cm. The steel cylinder is provided with steel end caps 15 (one end cap being illustrated at least in FIG. 6), which are welded to each end of the cylinder. An elongate shaft 16 extends through the hollow cylinder and through each end cap 15 such that the ends of the elongate shaft 16 can form supports for bearings.

On the outside of drum 14 is provided a plurality of paddles 17. These paddles 17 are welded to the outside of drum 14. Each paddle comprises a solid steel plate being substantially rectangular when viewed in plan, and having a length of between 5-20 cm, a width of between 3-10 cm and a thickness of between 2-5 mm. The paddles 17 are all approximately the same shape and size.

Paddles 17 are provided with a front leading face 18 and a rear face 19. The front face is substantially flat. The rear face is reinforced with a steel bracket 20 which is welded to rear face 19 and also welded to the surface of drum 14 to prevent the paddles 17 from bending or snapping off the drum as the paddles are forced through the windrow material.

Paddles 17 are attached along the outside of drum 14 in a particular manner. The paddles 17 are formed into rows with each row comprising a plurality of paddles (between 7-9 separate paddles) defining a helical path along the outside of the drum this being particularly illustrated in FIG. 5, FIG. 6, FIG. 3 and FIG. 4. Referring specifically to these illustrations, there is provided a pair of opposed rows 21, 22 which may be best illustrated in FIG. 4. The paddles in row 21 extend from adjacent one end 23 of drum 14 (see FIG. 4) and terminate approximately midway 24 along the drum which can be called a central focal area. Similarly, the paddles in row 22 extend from adjacent the other end 25 of drum 14 and terminate at the midway point 24. As drum 14 (and therefore paddles 17) rotates through a windrow, the helical pathway of each row of paddles 21, 22 assist in moving the material towards the centre focal area which therefore assists in shaping the windrow as the drum moves through the windrow. This is an advantage not shared by existing windrows turning devices.

In the particular embodiment illustrated in FIGS. 3-4 and FIGS. 5-6, the diameter of the drum is large enough to support two pairs of opposed rows, with one pair of opposed rows being approximately diametrically opposed to the other pair of opposed rows on the drum. This means that as the drum rotates a full 360°, the material in the windrow will be contacted twice during each full revolution of the drum. Thus in the particular embodiment, and especially with reference to FIG. 5 there is illustrated a first row 21 comprising between 7-9 paddles and the first two paddles of the second diametrically opposed row 26. Reference may also be had to at least FIG. 4 which shows 7-9 paddles on row 21 on the lower end of drum 14 and some of the paddles on the second row 26. Similarly, the other end of drum 14 is provided with a first row 22 (see FIG. 4) on the lower end of the drum and a second row 27 on the upper end of the drum.

It is envisaged that if the drum was of larger diameter again, it might be possible to have a third row on each end of the drum such that a full revolution of the drum causes the windrow material to be mixed three times.

Another feature of the embodiment of the present invention is that the paddles 17 on each row are angled relative to each other. This can be called the pitch of the paddle relative to the longitudinal axis of drum 14. Each row of paddles can be defined as having a distal end and a proximal end with the distal end being towards the end of the drum and a proximal end being towards the central portion of the drum. As an example, and referring to FIG. 4, row 21 contains a distal paddle 28 and a proximal paddle 29, there being intermediate paddles between distal paddle 28 and proximal paddle 29.

The pitch of the paddles in each row varies from the distal paddle to the proximal paddle in a uniform manner. In the particular embodiment, the pitch of distal paddle 28 is the largest and the pitch of proximal paddle 29 is the smallest. Specifically, and in the present embodiment, the pitch of distal paddle is typically between 45°-75° relative to the rotation axis of the drum 14, and the pitch of the most proximal paddle is generally in line with the longitudinal axis and therefore 0° or thereabouts. A consequence of these paddle angles in each row is that it promotes the movement of material in the windrow from the edge of the windrow to the centre of the windrow and promotes the throwing of the windrow material to a greater height in the middle of the windrow.

The paddles in a particular row are placed at continuously decreasing angles. The paddles in each row are uniformly spaced apart. The spacing between adjacent paddles may be approximately the width of each paddle. Thus, if a paddle has a width of about 5 cm, the spacing between paddles is also about 5 cm. If the drum has a pair of rows, the paddles in the second row may be positioned in the spacing area between the first row of the paddles to maximise mixing as the drum rotates.

The helical pattern on each row and in the preferred embodiment is such that a row of paddles progress from the outside of the drum to the central area of the drum in a single revolution or less. If a pair of rows is provided, the helical pattern may be such that each row progresses from the outside of the drum to a central area of the drum in half a revolution.

Figure 8:
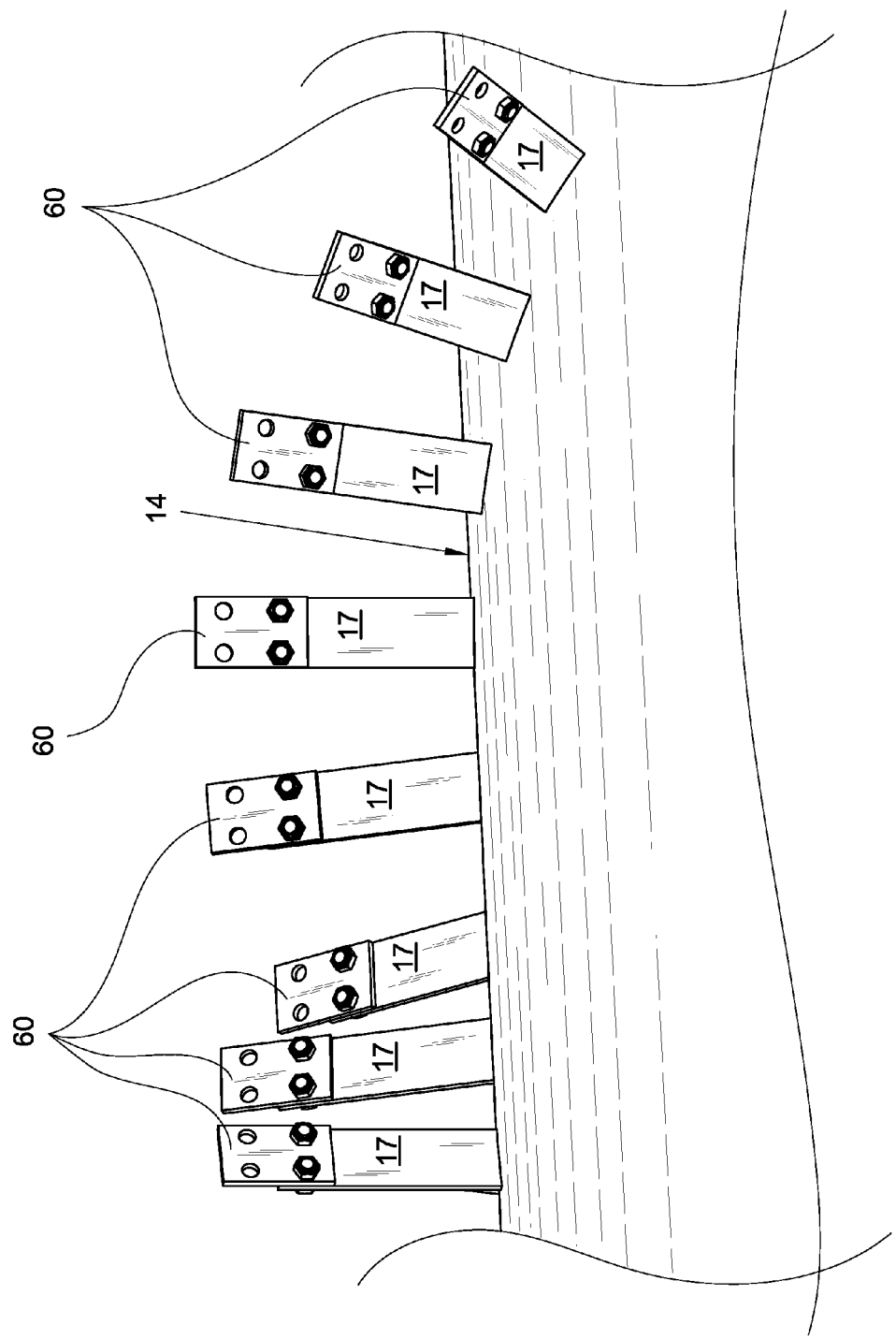
FIG. 8. Illustrates a close up of the paddles and particularly illustrating the replaceable tips.

Each paddle is provided with a replaceable tip 60. Tip 60 comprises a steel plate which is substantially rectangular and which can be bolted or otherwise fastened to the respective paddle. The tip can be replaced when worn. Another advantage with the replaceable tip 60 is that the shape of the tip can be varied depending on the type of material in the windrow. For instance, the shape of tip 60, instead of being rectangular, as illustrated in FIG. 8 may be provided with teeth or other shapes and configurations which can assist in tearing fibrous material into smaller pieces.

The paddles are placed on the drum along a line or lines that can match that of a screw or auger. The angle of this line need not be specified as it does depend on the number of paddle rows (starts) and the width of the drum.

Single or multiple starts may be used dependent primarily on the diameter and length of the drum. A large diameter drum may benefit from two or even three starts.

The highly angled outside (distal) paddles promotes lateral movement of the material towards the centre, while the progressively less angled paddles towards the proximal end of the row will promote the maximum vertical throw of material to maximise windrow height. The continuous sequence of paddles provides for optimised action and the close spacing of the paddles ensures that very little material is left untouched.

The drum 14 with the particularly positioned paddles 17 as described above can form part of a windrow apparatus which will now be described in greater detail and with reference at least to FIGS. 1-4. The apparatus 30 comprises some form of chassis or framework which in the particular embodiment comprises opposed side frames 32, 33 best illustrated in FIG. 1 and FIG. 2 and an interconnecting and somewhat curved upper frame 34. The frames will typically be made of steel sheet and steel box section or steel tubes and can be attached in the usual manner which may comprise fasteners or welding.

Each side frame 32, 33 in the particular embodiment comprises a substantially vertical sheet member to form sidewalls. Each side wall contains a bearing assembly 35 (see for instance FIG. 1) which rotatably supports the ends of shaft 16 which extends from each end of drum 14 in the manner described above. This enables drum 14 to be rotatably supported to the apparatus.

Figure 2:
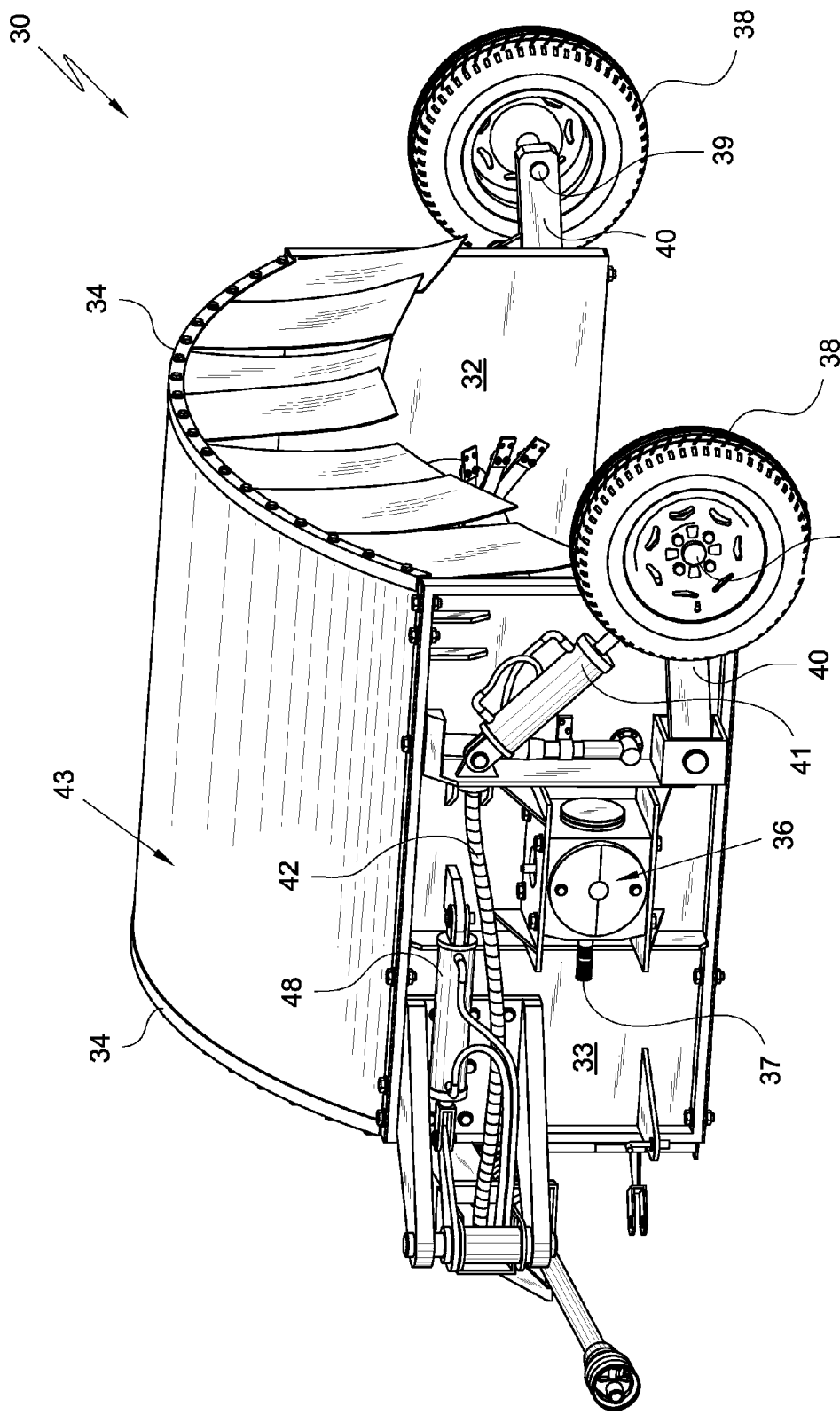
FIG. 2. Illustrates the apparatus of FIG. 1 from the opposite side.

Drum 14 is rotated by a drive means 36 which is best illustrated in FIG. 2. Drive means 36 in the particular embodiment comprises a gearbox arrangement which has a projecting coupling 37 which is connected to a rotatable drive shaft (described in greater detail below) with rotatable drive shaft being ultimately powered by the PTO of the tractor.

Figure 1:
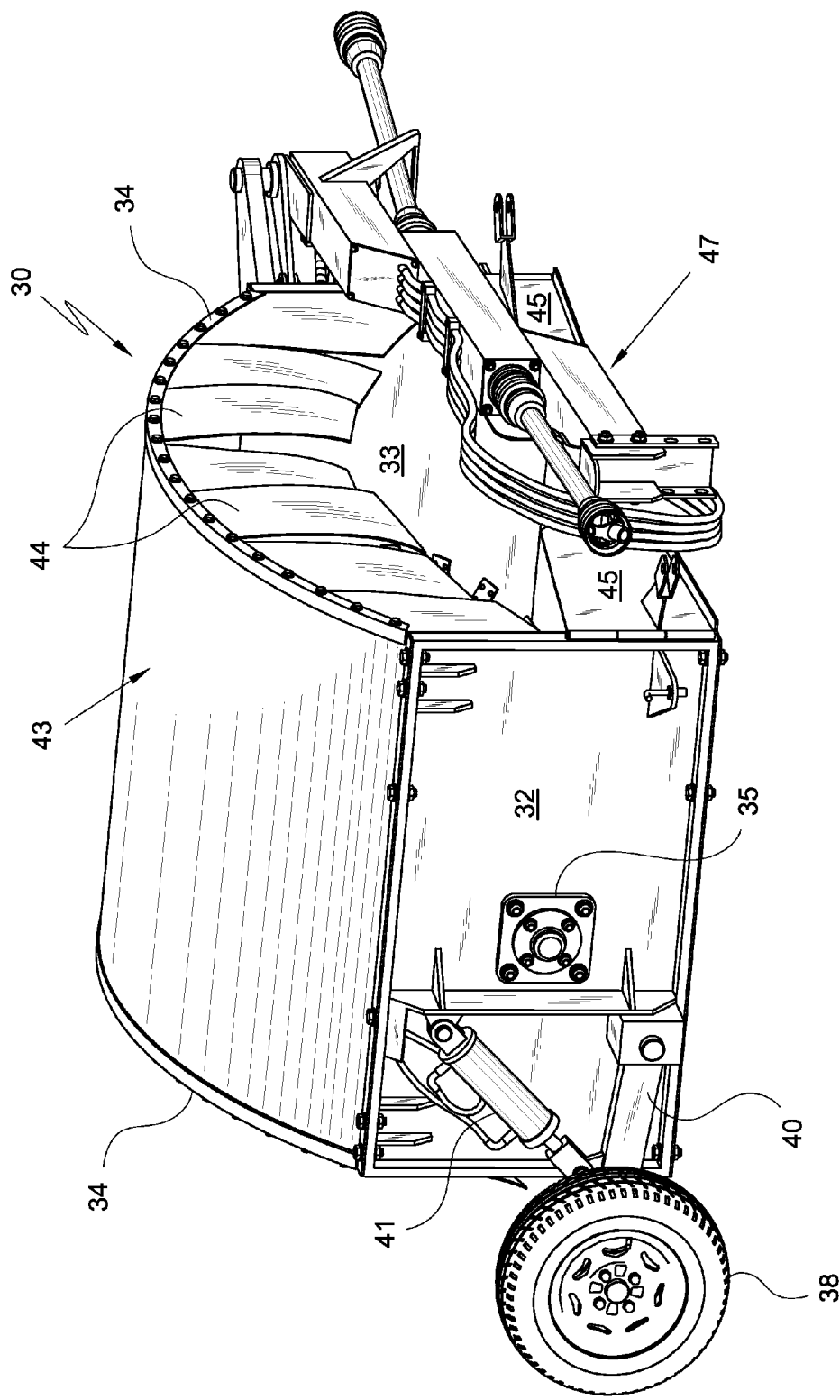
FIG. 1. Illustrates an apparatus according to an embodiment of the invention in the storage "non-use" position, with the tow arm folded.
Figure 7:
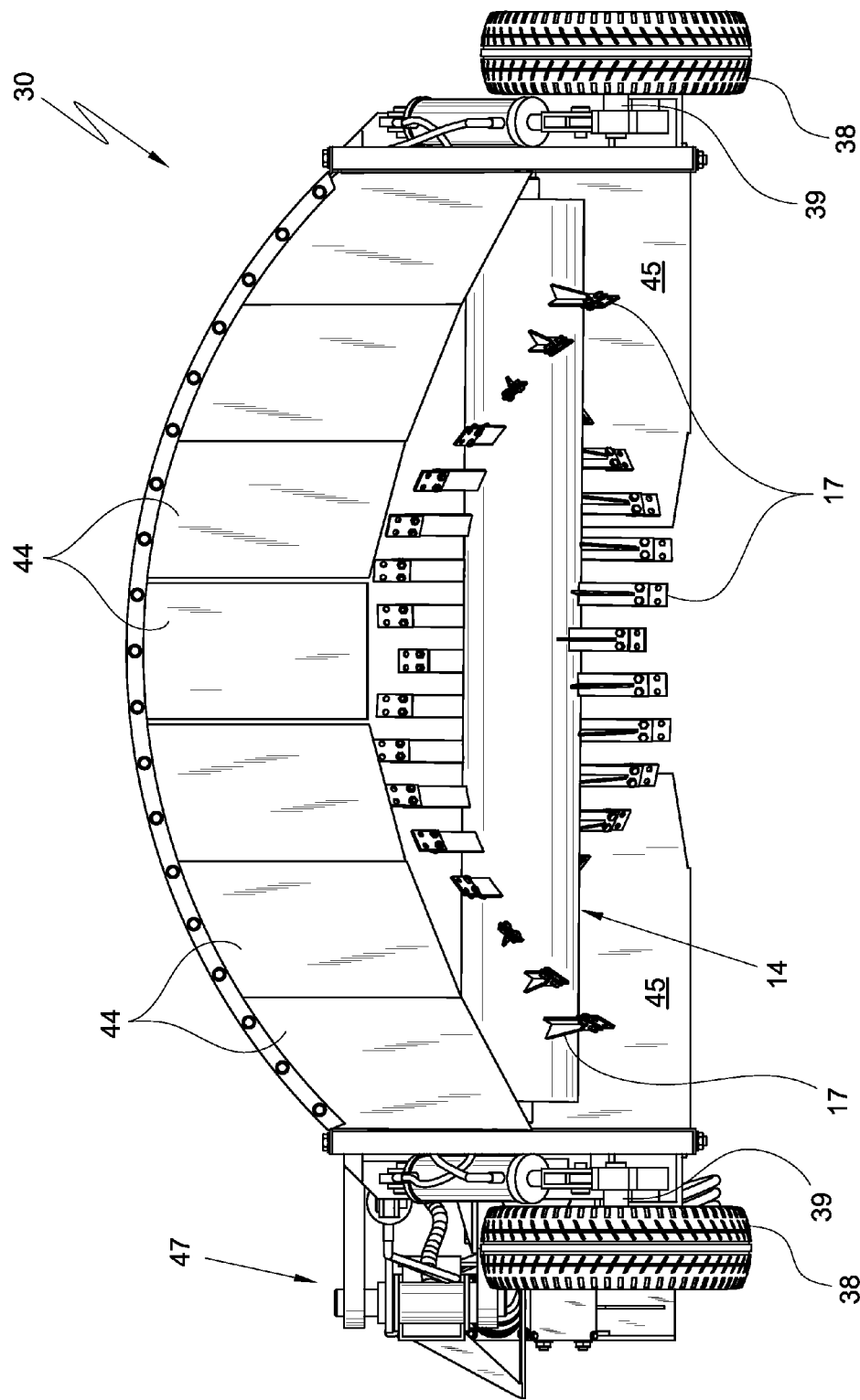
FIG. 7. Illustrates a rear view of the apparatus containing the drum of FIGS. 5-6.

The apparatus further comprises a pair of ground wheels 38. The wheels are illustrated in FIG. 1 and FIG. 2 but have been removed in FIG. 3 and FIG. 4. Each wheel 38 is mounted to a short stub axle 39 (see FIG. 7) which is attached to one end of an arm member 40. The other end of each arm member 14 is hinged or pivoted to part of the respective side frame 32, 33 about a substantially horizontal axis which enables the arm member to move up and down. Each arm member is operated by a ram 41. Extension of ram 41 causes the arm to pivot downwardly and therefore causes the apparatus to be raised further above the ground, and retraction of ram 41 causes the arm to pivot upwardly and therefore causes the apparatus to be lowered towards the ground. When the apparatus is raised above the ground, it can be more easily transported to and from the work area and when being worked along a windrow, it is advantageous for the apparatus to be lowered such that the drum and the paddles can properly engage the windrow material.

The rams 41 can be powered by the tractor and can be connected via hydraulic conduits 42 to the tractor in a known manner.

The short stub axles 39 are conventionally at right angles to the direction of travel of the apparatus. However, and as illustrated in the prior art apparatus in FIG. 10, the tractor 11 by necessity cannot be in front of the windrow apparatus 10 and needs to be on one side of the windrow. This causes the windrow apparatus to be pulled in a sideways manner as well is a forward manner which causes crabbing. In the embodiment of the present invention, this sideways action can be reduced by having the stub axles 39 offset by about 5° to the normal right angles which compensates for the sideways action. Thus, the angle of the wheels is such to slightly drive the apparatus in a manner opposite to the sideways action to at least partially cancel out the sideways action.

The apparatus 30 contains an upper curved covering or hood 43 which can be made of sheet metal but may also be a tarpaulin or a flexible sheet material. Depending flaps 44 (see at least FIG. 1) depend from the covering 43 in front of the drum 14 and also behind drum 14 this being illustrated at least in FIG. 7.

Figure 4:
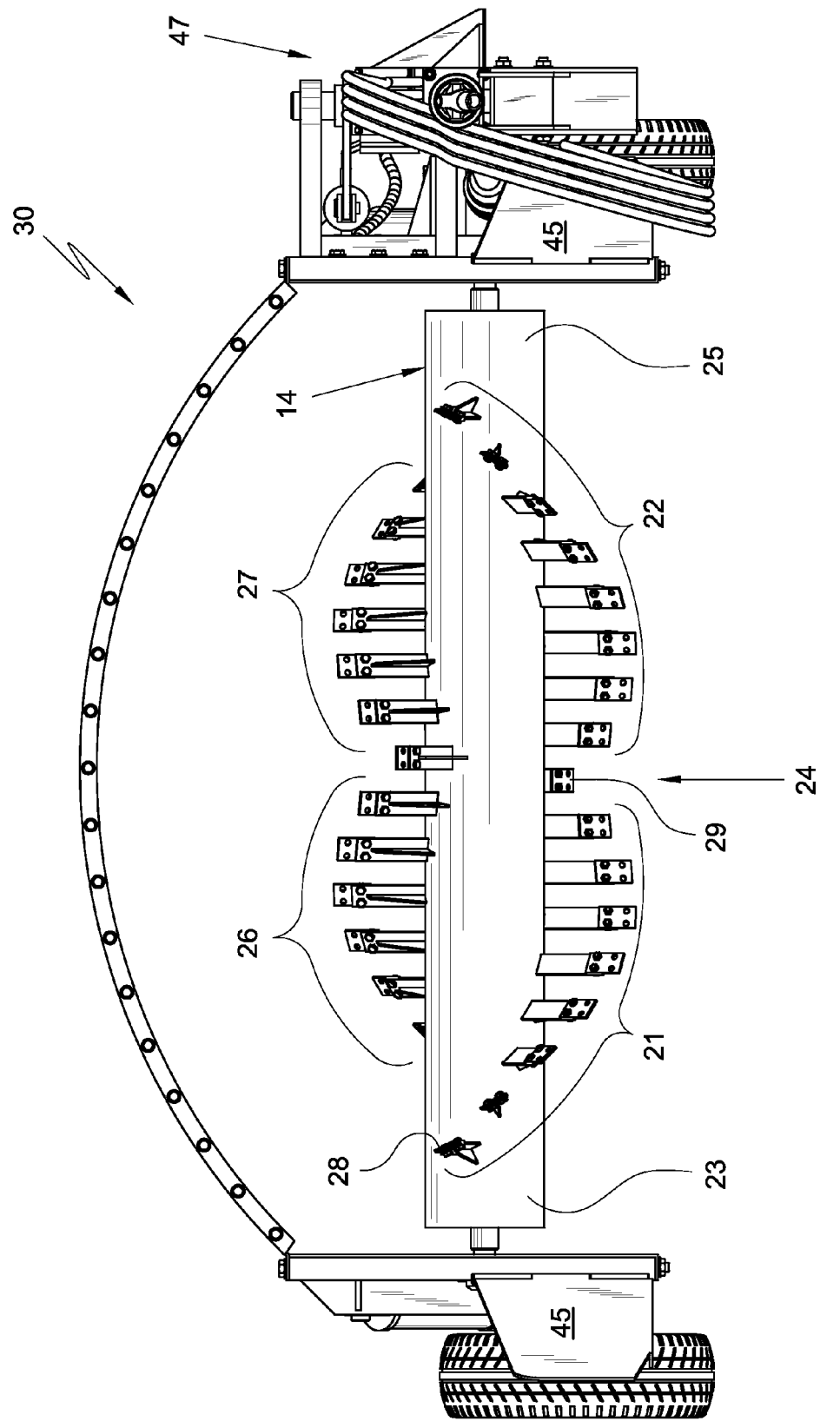
FIG. 4. Illustrates a front view of the apparatus, with flaps 44 of FIG. 1 omitted for clarity, illustrating the drum and the particularly oriented paddles on the drum.
Figure 9:
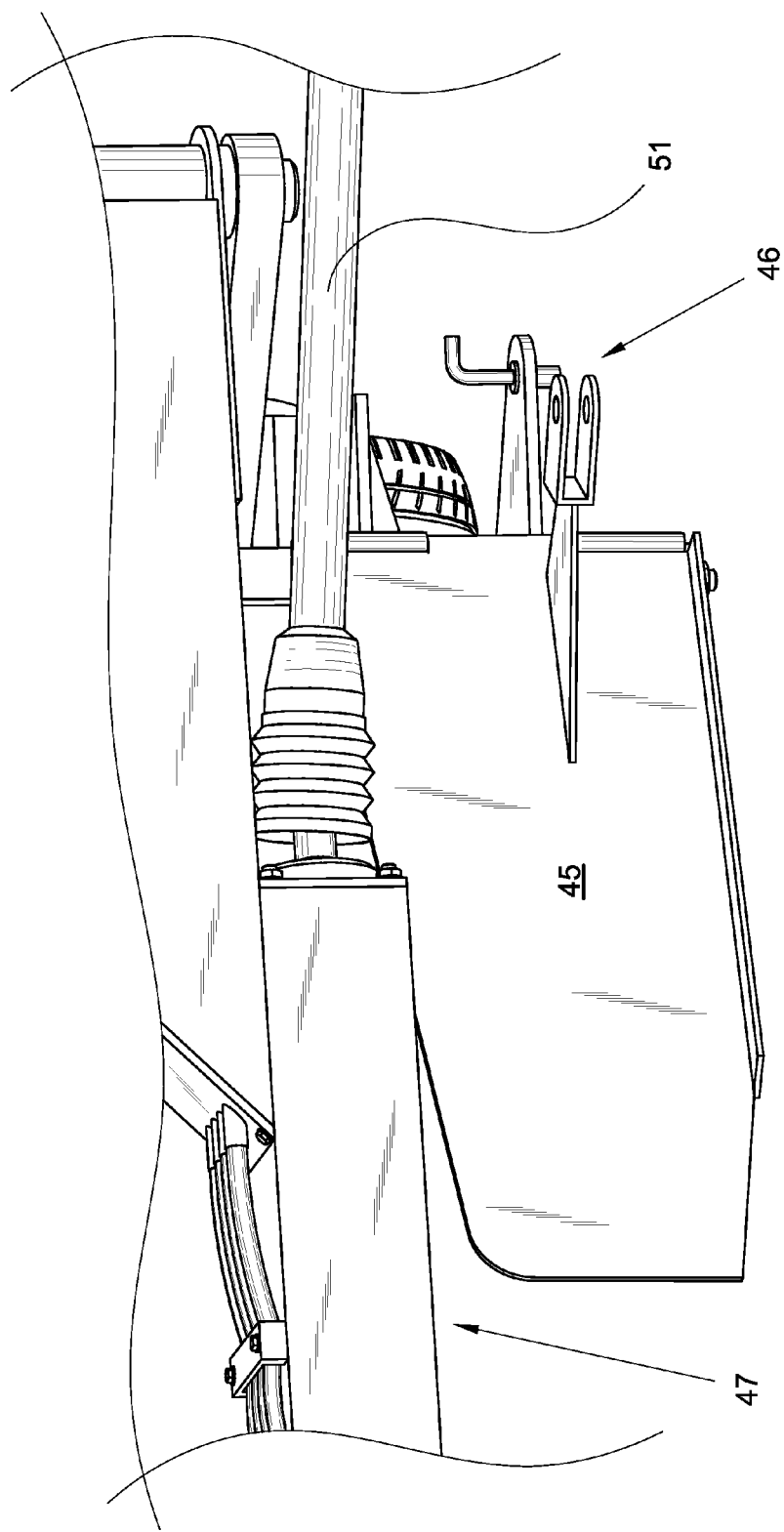
FIG. 9. Illustrates one of the two front guide members.

The apparatus comprises a pair of forwardly extending metal guides or flaps 45 these being illustrated at least in FIG. 4 and one said flap being illustrated in FIG. 9. Referring to FIG. 9, the flap can move between a non-use folded position illustrated in FIG. 4 and FIG. 9 and a use position where the flap is swung outwardly by approximately 90° or more to extend along each side of a windrow. When the flap is swung outwardly it can be locked in place by a small locking mechanism 46 which is illustrated in FIG. 9.

Figure 3:
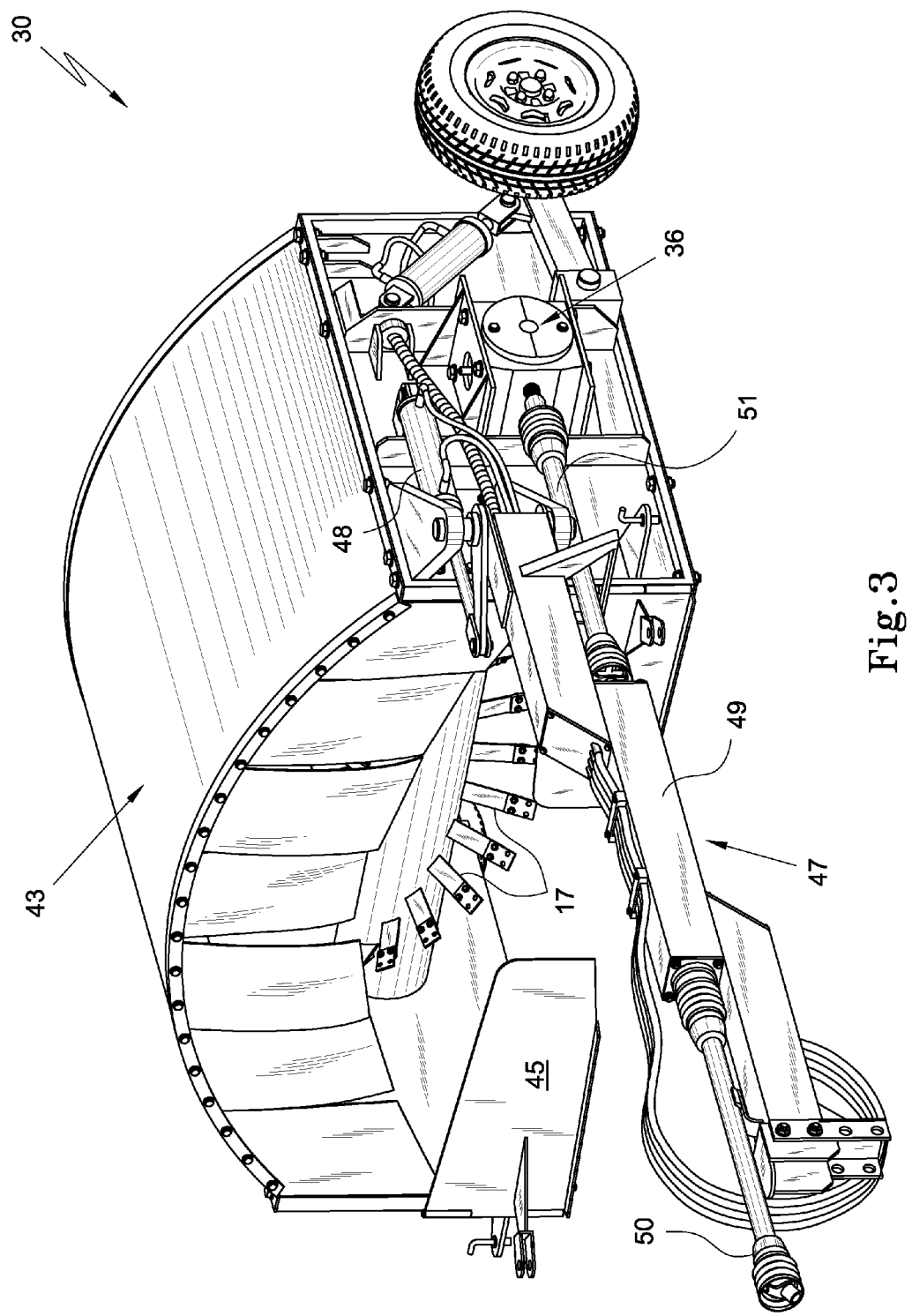
FIG. 3. Illustrates a forward view of the apparatus with the tow arm extended (the ground wheels being removed).

The apparatus contains a tow arm 47 which can move between a folded non-use position illustrated in FIG. 1 and an extended use position illustrated in FIG. 3 and FIG. 4 where the tow arm can be attached to the rear of a tractor (the tractor not being illustrated). The tow arm can be operated by a ram 48 which is best illustrated in FIG. 2. Operation of ram 48 causes extension and retraction of the tow arm in a swinging manner.

Tow arm 47 comprises a central box section 49 (see FIG. 3) through which extends a drive shaft (not illustrated). The forward end of drive shaft attaches to a PTO extension member 50 via universal joint. Similarly, the rear end of drive shaft attaches to another PTO extension member 51 again via a universal joint. Extension member 51 attaches to the drive means 36 again via a universal joint such that rotation of the extension member causes rotation of the drum. The front extension member 50 attaches to the PTO on the rear of the tractor. The tow arm also supports the various hydraulic conduits which operates the rams on the apparatus.

Ram 48 can be operated to extend the tow arm in the manner illustrated in FIG. 3 and FIG. 4 such that when the tow arm is attached to the rear of a tractor, the windrow apparatus 30 extends behind and to one side of the tractor this being quite similar to that illustrated in the prior art device of FIG. 10. However, the ram can also be operated such that the tow arm 47 is in the partially folded position and specifically such that the front of the tow arm is in front of and approximately midway across the apparatus. In this position, the apparatus 30 can be quite easily towed behind the tractor to and from the work site and in this position the apparatus is substantially in line with the tractor (making transportation easier) and not to one side of the tractor (which is the use position). When the apparatus 30 is transported to the front of a windrow, ram 48 can be further operated to cause the apparatus 32 now adopt a position behind and to one side of the tractor which is the use position.

The apparatus may comprise a pair of drums as described above with one drum in front of the other drum. This may provide better treatment of a windrow.

Use for the Invention

The above description identifies at least one specific, substantial and credible use for the invention.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

I claim:

1. An elongate rotatable drum for use in a windrow turning apparatus having a longitudinal axis of rotation, the drum comprising paddles adapted to engage with material in the windrow, the paddles comprising at least one pair of opposed rows, each row comprising a plurality of paddles defining a helical path along the drum, the helical path of the paddles on said one opposed row and the helical path of the paddles on the other said opposed row promoting movement of said material to a common focal area,
    wherein the paddles of each said row have different pitch angles relative to the axis of rotation, the pitch angles decreasing from adjacent the edge of the drum to the center of the drum.

2. The drum of claim 1, containing a first said row of paddles extending from adjacent one end of the drum and a second said row of paddles extending from adjacent the other end of the drum, each row defining a helical path along the drum to promote movement of material from the edge of the drum towards the center of the drum upon rotation of the drum through said material.

3. The drum of claim 2, wherein each row extends to a central portion of the drum.

4. The drum of claim 3, wherein the row of paddles progress from adjacent the end of the drum to the central portion of the drum in a single revolution of the drum.

5. The drum of claim 1, wherein the pitch angle is between 45°-75° adjacent the edge of the drum and about 0° adjacent the central portion of the drum.

6. The drum of claim 1, wherein the pitch angle decreases continuously along the row of paddles.

7. The drum as claimed in claim 2 comprising removable tips on at least some of the paddles.

8. A windrow apparatus comprising at least one elongate rotatable drum for use in a windrow turning apparatus having a longitudinal axis of rotation, the drum comprising paddles adapted to engage with material in the windrow, the paddles comprising at least one pair of opposed rows, each row comprising a plurality of paddles defining a helical path along the drum, the helical path of the paddles on said one opposed row and the helical path of the paddles on the other said opposed row promoting movement of said material to a common focal area,
    wherein the paddles of each said row have different pitch angles relative to the axis of rotation, the pitch angles decreasing from adjacent the edge of the drum to the center of the drum.

9. The apparatus of claim 8, comprising ground wheels which are adjustable to raise or lower the apparatus relative to the ground.

10. The apparatus of claim 9, wherein the ground wheels travel along a track which is offset relative to the direction of travel of the apparatus.

11. The apparatus of claim 8, including a tow arm.

12. The apparatus of claim 11, wherein the tow arm is hingedly attached to the apparatus and is adapted for movement between a folded nonuse position where the tow arm extends across the apparatus and an extended use position where the tow arm extends in front of the apparatus.

13. The apparatus of claim 11, including a ram to operate the tow arm.

14. The apparatus of claim 11, wherein the tow arm is adapted for movement to a transport position where the forward end of the tow arm is in front of the apparatus and approximately midway across the apparatus.

15. A windrow apparatus comprising at least one elongate rotatable drum which has paddles adapted to engage with material in the windrow, the paddles comprising at least one pair of opposed rows, each row comprising a plurality of paddles defining a helical path along the drum, the helical path of the paddles on said one opposed row and the helical path of the paddles on the other said opposed row promoting movement of said material to a common focal area, the apparatus further comprising ground wheels which are adjustable to raise or lower the apparatus relative to the ground, the ground wheels being angled to travel along a track which is offset relative to the direction of travel of the apparatus, and a tow arm which is hingedly attached to the apparatus and which is adapted for movement between a folded nonuse position where the tow arm extends across the apparatus and an extended use position where the tow arm extends in front of the apparatus;
    wherein the paddles of each said row have different pitch angles relative to the axis of rotation, the pitch angles decreasing from adjacent the edge of the drum to the center of the drum.

* * * * *